INVENTOR
CHARLES A. JUDSON
JOHN R. READ
PHILIP E. HUNTER
BY Wilkinson + Mawhinney
ATTORNEYS Oct. 21, 1952 — C. A. JUDSON ET AL — 2,614,799
MULTISTAGE TURBINE DISK CONSTRUCTION FOR GAS TURBINE ENGINES
Filed Oct. 13, 1947

INVENTOR
CHARLES A. JUDSON
JOHN R. READ
& PHILIP E. HUNTER
BY Wilkinson & Mawhinney
ATTORNEYS Patented Oct. 21, 1952

2,614,799

UNITED STATES PATENT OFFICE 2,614,799

MULTISTAGE TURBINE DISK CONSTRUCTION FOR GAS TURBINE ENGINES

Charles Alan Judson, Borrowash, John Radcliffe Read, Duffield, and Philip Edgar Hunter, Chellaston, England, assignors to Rolls-Royce Limited, Derby, England, a British company Application October 13, 1947, Serial No. 779,553
In Great Britain, October 2, 1946

Section 1, Public Law 690, August 8, 1946.
Patent expires October 2, 1966

17 Claims. (Cl. 253—69)

This invention relates to gas-turbine engines of the kind comprising a compressor-unit, combustion-equipment and a turbine-assembly, and is particularly concerned with such engines having multi-stage turbines of the axial type. An application of the invention is to gas-turbine-engines for aircraft-propulsion in which an airscrew or fan is driven by the engine, or the engine functions as a pure jet-propulsion unit. The invention however may be applied to any form of gas-turbine engine involving two or more stages in the turbine.

The object of the invention is to provide a turbine assembly having features of advantage in respect of ease of assembly and disassembly, lightness of structure, whilst maintaining efficient structural rigidity to avoid flexural and other vibrations. Preferred embodiments also facilitate cooling of the turbine discs and blading.

According to this invention in one aspect, a turbine rotor assembly for a gas-turbine-engine of the kind referred to comprises two or more axially-spaced turbine discs of which one disc is secured to an adjacent disc by means including a centrally-disposed bolt member extending shaftwise through the said disc and engaging a threaded nut-like member which is located between said discs and secured to the adjacent disc to clamp the discs together and a spacer ring of greater radius than the bolt member arranged between discs to abut the opposed faces thereof; preferably the discs are also arranged to abut one another at an inner radius intermediate the bolt member and the spacer ring. Such a construction of rotor assembly is readily assembled and dismantled and by selective spacing at the spacer ring and intermediate abutment a desired degree of nip of the discs can be secured to stabilize the turbine rotor assembly.

The invention has particular application to a two-stage turbine, in which it is desirable to avoid an axial bore through the first or high pressure stage, owing to its stress conditions. The invention accordingly provides in another aspect a turbine-rotor-assembly comprising two axially-spaced turbine discs of which one disc is formed with a central bore and an adjacent disc has no central bore, and wherein the first said disc is clamped to the said adjacent disc by interengaging nut and bolt members of which one is secured to the said adjacent disc and of which the bolt member extends shaftwise through the bore, abutment means being provided between the discs at inner and outer radii. The abutment at the outer radius may be provided by a spacer ring having opposed abutment surfaces to co-operate with corresponding surfaces on the opposed faces of the discs.

According to a feature of this invention, the inner radius abutment may be provided through a washer, which conveniently bears against a nut member carried on the said adjacent disc for engagement with the bolt member, and of which the thickness is selected to give a desired degree of nip of the discs on the spacer ring.

According to a preferred feature of this invention, the spacer ring is arranged to transmit torsional stresses between the discs, for example by being provided with radial teeth or splines to engage with teeth or splines formed on the discs.

The spacer ring may also be arranged to co-operate with a fixed sealing diaphragm to constitute a labyrinth seal between the rotor-assembly and the stationary turbine structure.

One embodiment of these and other features of the invention will now be described by way of example as applied to the turbine rotor assembly of a gas-turbine-engine having a two-stage turbine. The description has reference to the accompanying drawings in which.

Figure 1:
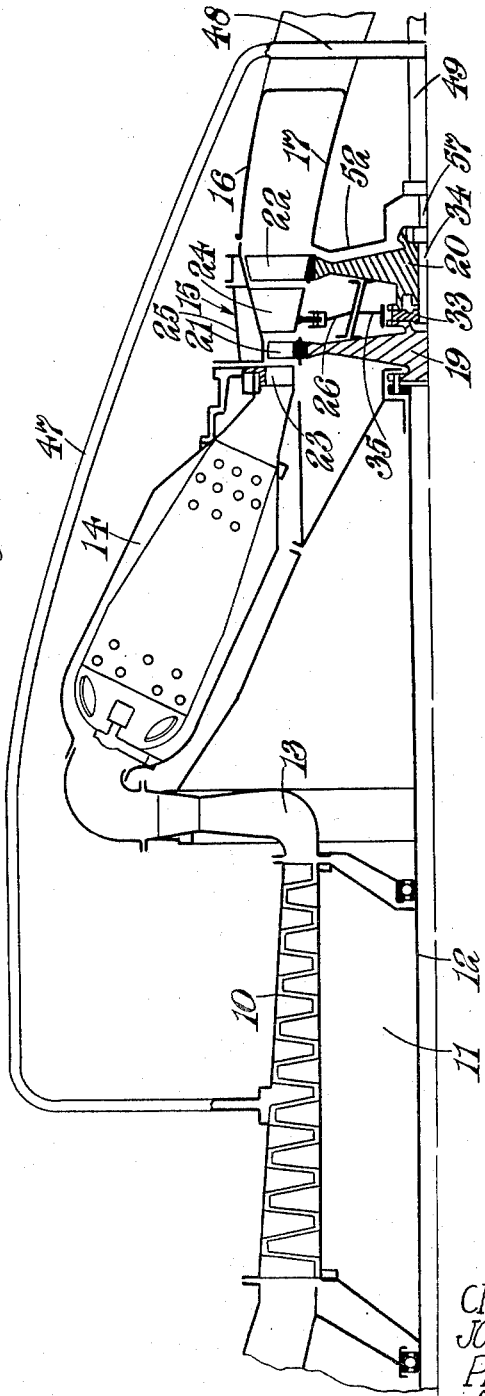
Figure 1 is a diagrammatic section through half of the gas-turbine engine.
Figure 2:
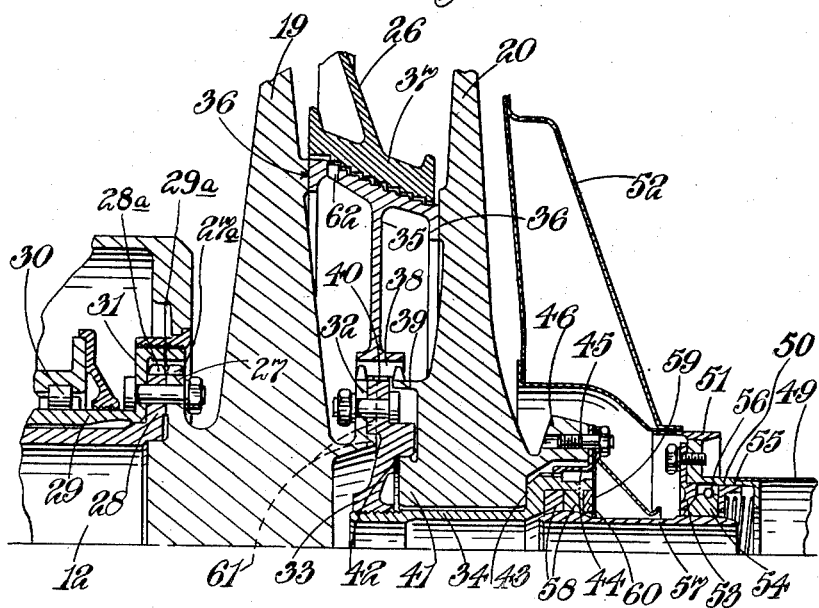
Figure 2 is a fragmentary-section through the turbine-rotor-assembly.

The gas-turbine engine comprises a compressor 10 the rotor 11 of which is mounted on a shaft 12 and which delivers air through a duct 13 to the combustion equipment 14. The combustion equipment 14 comprises a plurality of combustion chambers, such as that illustrated, disposed in a ring around the shaft 12 between the compressor 10 and a two-stage turbine 15. Fuel is burnt in the air delivered to the combustion equipment and the combustion products pass from the combustion equipment through the turbine to drive it and the turbine in turn drives the compressor through shaft 12. The exhaust gases pass from the turbine 15 into an annular exhaust duct formed between an outer exhaust casing 16 and a centrally-arranged conical member 17.

The turbine comprises a rotor assembly including two turbine discs 19, 20 carrying rotating blades 21, 22 respectively, a fixed nozzle-guide-vane assembly 23 directing the combustion products into the first-stage or high-pressure turbine blading 21 and a fixed nozzle-guide-vane assembly 24 intermediate the two turbine stages to direct the gases into the second-stage or low-pressure turbine. The nozzle-guide-vane assemblies 23, 24 are carried by a supporting structure 25. A sealing diaphragm 26 is located between the turbine discs 19, 20 and is supported from the nozzle-guide-vane assembly 24.

The turbine discs 19, 20 are of solid construction in the embodiment illustrated although if desired they may be of a hollow construction.

The disc 19 is designed with thickness appropriate to withstand centrifugal stresses; pure centrifugal stressing considerations may however result in a disc of rather slender cross-section and it is thought that by adopting a turbine rotor construction as described below, the section need not be increased unduly for the purpose of avoiding, by virtue of the strength of the disc alone, dangerous flexural vibrations.

The turbine disc 19 is formed on its forward face (that is, the face directed upstream of the flow through the turbine) with a peripherally-toothed, outwardly-directed flange 27 by which the disc 19 is bolted to a corresponding flange 28 on the end of shaft 12. The teeth 27a, 28a on the flanges 27, 28 engage co-operating teeth 29a on a sleeve 29 supporting the bearing 30 for the rear end of the shaft 12, the sleeve conveniently being provided with a flanged portion 31 to carry the teeth and to permit of its being bolted to the flanges 27, 28.

The turbine disc 19 has formed on its rearward face (that is, the face directed downstream of the flow through the turbine) at a radius close to its axis an annular, radially-directed flange 32 and to this flange is bolted and spigotted a flanged nut-like ring member 33.

Within the threaded portion of the nut-like ring member, there is engaged a hollow bolt member 34, which in effect constitutes a shaft-like support for the turbine disc 20. The bolt member 34 is coaxial with the disc 20 and extends through it and the disc 20 is secured in position by screwing the bolt member 34 into the ring nut 33.

A T-sectioned spacer ring 35 is located between the discs 19, 20 to encircle the bolt member 34. The cross-bar of the T-section is formed with an abutment surface 36 at each end which surfaces bear on corresponding surfaces of the discs 19, 20. The cross-bar is also of frusto-conical form and has its outer surface stepped to co-operate with a correspondingly-shaped flange 37 on the sealing diaphragm 26 to provide a labyrinth seal. The leg of the T-section 35 is formed at its inner radius with inwardly directed splines or teeth 38 which engage corresponding formations on the flange 32 on disc 19 and external splines or teeth formed on an axial flange 39 on the forward face of the disc 20 for transmitting torque between the two discs 19, 20. The leg also carries an inwardly directed formation 40 to seat on the periphery of the ring nut 33 to position the spacer ring in assembly.

The disc 20 also has an abutment on the disc 19 through the ring nut 33. For this purpose, the disc 20 is formed with a spigot-like part 41 which is received in a recess in the ring nut 33 and abuts against a washer 42 accommodated in the bottom of the recess.

It will be seen that when the disc 20 is secured in position on the bolt member 34, it is gripped at an inner radius between the washer 42 and the head 43 of the bolt member and has an abutment at an outer radius against the spacer ring 35. The thickness of the washer 42 is selected to accommodate variations in dimensions of the parts due to machining and so that when the bolt member 34 is screwed into the ring nut 33 by the appropriate amount a desired loading of the discs 19, 20 at their abutment with the spacer ring 35 is obtained. Such an arrangement provides a turbine rotor assembly capable of withstanding centrifugal and other stresses arising in operation without dangerous flexural vibrations arising.

A locking device is provided to ensure that the bolt member 34 does not slacken off, which device comprises a ring 44 with an axial extension formed with internal teeth to engage teeth on the periphery of the bolt head 43, the ring being secured by bolts 45 to a flange 46 on the disc 20.

The construction illustrated provides for the supply of cooling air to the space between the turbine discs 19, 20. For this purpose an arrangement forming the subject of the invention described in concurrent application Serial No. 779,552, filed October 13, 1947, by Judson et al. and now Patent No. 2,557,747 of June 19, 1951, may be provided. In this arrangement, air is bled off from the compressor 10 at a suitable point and conveyed through a conduit 47 to a point rearwardly of the turbine 15, and then by hollow struts 48 across the annular exhaust duct to an axial centrally-disposed tubular member 49 located in the conical structure 17.

The tubular member 49 is part of the fixed engine structure and to convey the cooling air to the interior of the hollow bolt member 34, the following arrangement is adopted.

The tubular member has at its forward end a tubular flanged extension 50 which is slidingly received in a collar 51 carried by the end diaphragm 52 of the conical structure. A ring-like end plate 53 is bolted to the extension 50 and has its rear face formed at its inner radius as a spherical seat to co-operate with a corresponding surface of a carbon sealing ring 54 which is held in contact wth the spherical seat by a spring-loaded ring 55 accommodated within the extension 50. The carbon sealing ring 54 is preferably split diametrically to accommodate wear in use and a spring garter 56 is provided to hold the parts together and in contact wth the rearward end of an intermediate duct 57 which extends between the tubular member 49 and the bolt member 34.

This arrangement allows relative sliding and canting of the intermediate duct 57 and tubular member 49.

The forward end of the intermediate duct 57 is received in a recess in the bolt head 43 and is formed with a spherical outer surface which co-operates with internal spherical surfaces of a carbon bearing ring 58, which is held in the bolt head 43 by a washer 60 and a spring plate 59 bolted to the flange 46 on the turbine disc 20. The carbon bearing ring 58 is split transversely to permit assembly and to accommodate wear.

This arrangement permits relative canting of the bolt member 34 and the intermediate duct 57.

It will be appreciated that tubular member 49 is stationary and the bolt member 34 is rotating so that the intermediate duct 57 rotates relative to both, and in use the greater part of the relative rotation occurs between the rearward end of the intermediate duct 57 and the carbon sealing ring 54.

The greater portion of air flowing into the intermediate duct 57 from the tubular member 49 passes into the hollow bolt member 34, but a small leak is permitted at the carbon sealing ring 54 and bearing ring 58 to provide cooling air for the rear face of disc 20.

The air flows into the space between disc 19 and ring nut 33 and then through radial channels 61 cut in the spigot on the flange 32 and in ring nut 33 to between the spacer ring 35 and disc 19. The cooling air then passes through ports 62 into the labyrinth seal, the ports 62 being positioned to meter the air to both the rear face of disc 19 and the forward face of disc 20. The air also cools the roots of the vanes in the guide-vane assembly 24 and the roots of the second-stage turbine blading 22.

We claim:

1. A turbine-rotor-assembly for a multi-stage axial-flow gas-turbine engine comprising a pair of blade-carrying discs which are axially spaced with respect to one another, one of said discs being formed centrally with an axial bore and means to support said one disc from the other disc comprising a bolt-like member arranged to extend through the axial bore in said one disc and to be engaged with a nut-like member to clamp the bolt-like member axially with respect to said one disc, said nut member being located between said discs and being secured to said other disc, and abutment means located between the two discs and comprising a spacer ring having abutting engagement with the two discs at a radius substantially greater than the radius of the bolt member.

2. A turbine-rotor-assembly as claimed in claim 1, wherein the abutment means comprises also means located radially between the bolt member and said spacer ring and having a preselected axial dimension to determine the axial spacing of the discs at the intermediate radius.

3. A turbine-rotor-assembly for a multi-stage axial-flow gas-turbine engine comprising a plurality of coaxial, axially-spaced blade-carrying discs whereof one disc at least is formed centrally with an axial bore, and means to support said bored disc from a second disc comprising a shaft-like bolt member extending through said axial bore coaxially with the discs, a nut member located between the discs and rigidly connected with said second disc to be coaxial with the discs, said bolt member having threaded engagement with the nut member and being arranged by said threaded engagement to draw said bored disc towards said second disc, and ring abutment means located between the discs and having abutting engagement with the said discs over surfaces radially spaced from said bolt member, thereby to determine the axial spacing of the discs at a radius on the discs intermediate their common axes and the peripheries of the discs.

4. A turbine-rotor-assembly as claimed in claim 3, wherein said ring abutment means comprises a spacer ring between the axially bored disc and the next adjacent disc, said spacer ring abutting by its ends on annular surfaces of said discs, said annular surfaces having a radius substantially greater than that of the bolt member, and wherein said ring abutment means also comprises second ring-like abutment means located between said bored disc and the said next adjacent disc, said second ring-like abutment means having a radius greater than the bolt member but less than the spacer ring so as to be radially spaced from both the bolt member and said spacer ring and having a preselected axial dimension such that when the bolt member is engaged with the nut member to draw the discs together a desired axial load is applied to the discs.

5. A turbine-rotor-assembly for a multi-stage axial-flow gas-turbine engine comprising a plurality of coaxial, axially-spaced blade-carrying discs whereof one disc at least is formed centrally with an axial bore, and means to support said bored disc from the next adjacent disc comprising a shaft-like bolt member extending through the axial bore in the bored disc, a nut member having threaded engagement with said bolt member, said nut being located between said bored disc and said next adjacent disc and being rigidly secured to said next adjacent disc, and said bolt member bearing on the bored disc such that on engagement of the bolt member with the nut member the bored disc is drawn towards the next adjacent disc, and abutment means between said bored disc and said next adjacent disc comprising a spacer ring having abutting engagement by its ends with said discs over surfaces spaced radially outwards from said bolt member, said spacer ring determining the axial spacing of said discs at a radius intermediate their common axis and their peripheries.

6. A turbine-rotor-assembly as claimed in claim 5, wherein said abutment means comprises also a member of preselected axial dimension located between said bored disc and the said next adjacent disc and determining the axial spacing of the discs at a radius intermediate the bolt member and the spacer ring.

7. A turbine-rotor-assembly as claimed in claim 5, wherein the abutment means comprises also a washer of selected axial thickness located in an axial recess in the nut member and an axial spigot on the bored disc to enter the recess and abut against the washer, said washer and axial spigot encircling the bolt member and having a radius greater than the outer radius of the bolt member so as to be radially spaced therefrom.

8. A turbine-rotor-assembly as claimed in claim 5, wherein said spacer ring is arranged to transmit torsional stresses between the bored disc and the adjacent disc.

9. A turbine-rotor-assembly as claimed in claim 8, wherein the spacer ring is provided with radially inwardly-directed teeth elements and said discs are provided with radially outwardly-directed teeth elements to engage with said inwardly-directed teeth elements of the spacer ring whereby the spacer ring connects the discs torsionally.

10. A turbine-rotor-assembly according to claim 9, wherein the spacer ring is radially of T-section with the leg of the T extending radially inwards from the spacer ring, said teeth elements being formed at the radially inner end of the leg of the T.

11. A turbine-rotor-assembly as claimed in claim 10, wherein the outer surface of the spacer ring is tapered from one disc towards the other disc and is of step-form to form one element of a labyrinth seal.

12. A turbine-rotor-assembly for a multi-stage axial-flow gas-turbine engine, comprising a main shaft, a high-pressure blade-carrying disc located beyond the end of said shaft and rigidly secured thereto, a low-pressure blade-carrying disc having a central axial bore therethrough and means to support the low-pressure disc from the high-pressure disc comprising a radial flange on the low-pressure side of the high-pressure disc, a nut member located coaxially with the discs and between them, a radial flange on the nut member by which the nut member is rigidly secured to the radial flange on the high-pressure disc, a shaft-like bolt member having a head in abutment with the low-pressure side of the low-pressure disc and extending through the bore in the low-pressure disc to engage by its end with the nut member, a spacer ring located between the discs and having a pair of axially-spaced abutment surfaces which respectively abut on abutment surfaces formed on the high-pressure disc and low-pressure disc at radii substantially greater than the radius of the bolt member, the spacer ring thus determining the axial spacing of the high-pressure disc and the low-pressure disc at a substantial radius from the axis of the discs, and abutment means having a selected axial dimension located between the discs and engaging therewith at a radius greater than that of the bolt member but less than that of the spacer ring.

13. A turbine-rotor-assembly as claimed in claim 12, comprising also a spigot-like axial extension on the low-pressure disc to engage within a recess in the flange on the nut member, said abutment means being located in said axial recess and comprising a washer of predetermined axial thickness.

14. A turbine-rotor-assembly as claimed in claim 13, comprising also means torsionally to engage the low-pressure disc with the high-pressure disc comprising a radially inwardly extending flange on the spacer ring, radially inwardly-directed spline elements on the inner end of said flange, radially outwardly directed teeth on the flange on the low-pressure side of the high-pressure disc cooperating with said spline elements, and radially outwardly directed teeth on the high-pressure side of the low-pressure disc also cooperating with said spline elements.

15. A turbine-rotor-assembly as claimed in claim 14, wherein said spacer ring tapers from the high-pressure disc towards the low-pressure disc and has its external surface of stepped form to form one element of a labyrinth seal.

16. A turbine-rotor-assembly for a multi-stage axial-flow gas-turbine engine comprising a plurality of axially-spaced blade-carrying discs whereof two discs are end-discs having only one disc adjacent to each and whereof one end-disc is formed centrally with an axial bore, a nut-like member carried on the other end-disc to be coaxial with the discs and located between said other end-disc and its adjacent disc, means to secure the plurality of axially-spaced blade-carrying discs together comprising a shaft-like bolt member extending through said bored end-disc to engage in tension with the nut-like member, and abutment means located between adjacent discs comprising abutment surfaces on said discs radially spaced from said bolt member and a spacer ring having abutting engagement by its ends with the abutment surfaces of said discs, said spacer ring determining the spacing of the discs at a radius on the discs intermediate their axes and their peripheries.

17. A turbine-rotor-assembly as claimed in claim 16, wherein said abutment means also comprises a member of preselected axial dimension located between said bored disc and its adjacent disc to determine the axial spacing of the discs at a radius intermediate the bolt member and the spacer ring.

CHARLES ALAN JUDSON.
JOHN RADCLIFFE READ.
PHILIP EDGAR HUNTER.

REFERENCES CITED

The following references are of record in the file of this patent:

UNITED STATES PATENTS

| Number | Name | Date |
|---|---|---|
| 925,218 | Nikonow | June 15, 1909 |
| 1,267,229 | Junggren | May 21, 1918 |
| 2,213,940 | Jendrassik | Sept. 3, 1940 |
| 2,296,023 | Dallenbach et al. | Sept. 15, 1942 |
| 2,369,795 | Planiol et al. | Feb. 20, 1945 |
| 2,399,046 | Larrecq | Apr. 23, 1946 |
| 2,401,826 | Halford | June 11, 1946 |
| 2,418,967 | Clark | Apr. 15, 1947 |
| 2,427,614 | Meier | Sept. 16, 1947 |
| 2,452,782 | McLeod et al. | Nov. 2, 1948 |
| 2,461,242 | Soderberg | Feb. 8, 1949 |

FOREIGN PATENTS

| Number | Country | Date |
|---|---|---|
| 319,622 | Great Britain | Dec. 18, 1930 |
| 343,462 | Germany | Nov. 2, 1921 |
| 352,282 | Germany | Apr. 24, 1922 |